United States Patent
Gouda et al.

(10) Patent No.: US 11,764,382 B1
(45) Date of Patent: Sep. 19, 2023

(54) POLYMERIC ELECTROLYTE NANOFIBER MEMBRANE

(71) Applicant: KING FAISAL UNIVERSITY, Hofouf (SA)

(72) Inventors: Mohamed Gouda, Hofouf (SA); Hany Mohamed Abd Ellateef Ahmed, Hofouf (SA); Faisal F. Almaheish, Hofouf (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 17/845,664

(22) Filed: Jun. 21, 2022

(51) Int. Cl.
*H01M 8/103* (2016.01)
*H01M 8/1067* (2016.01)
*H01M 8/10* (2016.01)

(52) U.S. Cl.
CPC ......... *H01M 8/103* (2013.01); *H01M 8/1067* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 8,501,367 | B2 | 8/2013 | Holme et al. |
| 9,385,388 | B2 | 7/2016 | Sung et al. |
| 2018/0083307 | A1* | 3/2018 | Makino ............... H01M 10/056 |
| 2020/0091532 | A1 | 3/2020 | Okamoto et al. |
| 2021/0119237 | A1 | 4/2021 | Lee et al. |

FOREIGN PATENT DOCUMENTS

| | | |
|---|---|---|
| CN | 113270622 A | 8/2021 |
| JP | 2013-237942 A | 11/2013 |
| JP | 2020-181701 A | 11/2020 |

OTHER PUBLICATIONS

Xiao et al., High-Strain Sensors Based on ZnO Nanowire/Polystyrene Hybridized Flexible Films, 2011, Adv Mater, 23, 5440-5444 (Year: 2011).*

Xue et al., Electrospinning and Electrospun Nanofibers: Methods, Materials, and Applications, 2019, Chem. Rev., 119, 5298-5415 (Year: 2019).*

Xue et al., "Electrospinning and Electrospun Nanofibers: Methods, Materials, and Applications," Chemical Reviews, Apr. 24, 2019: 119(8), 5298-5415.

* cited by examiner

*Primary Examiner* — Daniel S Gatewood
(74) *Attorney, Agent, or Firm* — Nath, Goldberg & Meyer; Richard C. Litman

(57) ABSTRACT

A polymeric electrolyte nanofiber membrane can include polymeric electrolyte nanofibers (PENF) from three polymeric nanofiber materials, namely polypyrrole (PPy), cellulose derivatives (CD) and polystyrene (PS). Each of the nanofibers include aligned metal nanowires (MNW). The metal nanowires (MNWs) can include a metal selected from at least one of copper (Cu) and Zinc (Zn). The PENFs can be formed using electrospinning. The MNWs can be formed using hydrothermal methods. The PPy nanofiber mats can have a uniform thickness ranging from about 10 μm to about 20 μm. The ZnO nanowires can have a hexagonal structure with diameters ranging from about 60 nm to 100 nm and lengths varying from about 1 μm to about 3 μm.

16 Claims, No Drawings

POLYMERIC ELECTROLYTE NANOFIBER MEMBRANE

BACKGROUND

1. Field

The disclosure of the present patent application relates to a polymeric electrolyte nanofiber membrane and, particularly, to a polymeric electrolyte nanofiber membrane including three different polymeric nanofiber materials.

2. Description of the Related Art

The demand for hydrogen fuel cells has risen in past years because they are one of the most environmentally friendly methods of producing hydrogen. Electrochemical energy conversion in fuel cells is a key technology in the development of the hydrogen economy. Proton exchange membrane fuel cells are appropriate for a plethora of applications, including the transportation sector. Nevertheless, commercialization of proton exchange membrane fuel cells is restricted by two challenges, low durability and high cost. Commercialization can be successfully achieved with technologies that enhance durability, performance, and cost while conserving energy conversion and power generation organization.

Thus, a polymeric electrolyte nanofiber membranes solving the aforementioned problems is desired.

SUMMARY

A polymeric electrolyte nanofiber membrane can include polymeric electrolyte nanofibers (PENF) from three separate polymeric nanofiber materials, namely polypyrrole (PPy), cellulose derivatives (CD) and polystyrene (PS). Each of the nanofibers include aligned metal nanowires (MNW). The metal nanowires (MNWs) can include a metal selected from at least one of copper (Cu) and Zinc (Zn). The PENFs can be formed using electrospinning. The MNWs can be formed using hydrothermal methods. The PPy nanofiber mats can have a uniform thickness ranging from about 10 μm to about 20 μm. The ZnO nanowires can have a hexagonal structure with diameters ranging from about 60 nm to 100 nm and lengths varying from about 1 μm to about 3 μm.

These and other features of the present subject matter will become readily apparent upon further review of the following specification.

DETAILED DESCRIPTION OF THE PREFERRED EMBODIMENTS

A polymeric electrolyte nanofiber membrane can include a plurality of polymeric electrolyte nanofibers (PENF) and an aligned metal nanowire (MNW) in each of the nanofibers. The nanofibers can include at least one polymeric nanofiber material selected from the group consisting of polypyrrole (PPy), cellulose derivatives (CD) and polystyrene (PS). Examples of cellulose derivatives include, for example, methylcellulose, hydroxypropyl cellulose, and carboxymethyl cellulose (CMC). In an embodiment, the polymeric electrolyte nanofibers include polypyrrole. In an embodiment, the cellulose derivatives include polystyrene-g-cellulose copolymer. The metal nanowires (MNWs) can include a metal selected from at least one of copper (Cu) and Zinc (Zn).

In an embodiment, all of the polymeric electrolyte nanofibers of the polymeric electrolyte nanofiber membrane are made from only one polymeric nanofiber material, such as polypyrrole. In an embodiment, all of the polymeric electrolyte nanofibers are made from polypyrrole and the metal nanowires (MNWs) include a metal selected from at least one of copper (Cu) and zinc (Zn).

In an embodiment, the polymeric electrolyte nanofiber membrane has a uniform thickness ranging from about 10 μm to about 20 μm and includes polymeric electrolyte nanofibers made from polypyrrole and ZnO aligned metal nanowires. In an embodiment, the polypyrrole nanofibers can have a diameter of about 140 nm. The Zno metal nanowires are hexagonal and have a diameter ranging from about 60 nm to about 100 nm and a length ranging from about 1 μm to about 3 μm. As used herein, the term "about," when used to modify a quantity, means within 10% of the modified quantity.

A method of forming a polymeric electrolyte nanofiber membrane can include forming a homogenous, viscous solution including polypyrrole and ZnO nanowire, electrospinning the solution to form nanofibers including the Zno nanowires, and depositing the nanofibers on a paper target to form the polymeric electrolyte nanofiber membrane. The capillary tip of the syringe of the electrospinning unit used can have a diameter of about 0.5 mm. The polymer solution can be electrospun at 30 kV driving voltages at ambient temperature. The polymeric electrolyte nanofiber membrane can be in the form of a non-woven, fibrous mat having a uniform thickness ranging from about 10 μm-20 μm.

A method of forming metal nanowires can include use of hydrothermal methods. For example, a method of preparing ZnO nanowires can include preparing an aqueous solution of equal concentrations of zinc acetate hexahydrate and hexamine, adjusting a pH of the aqueous solution to pH 9 to provide a basic solution, and heating the basic solution to provide a powder including the metal nanowires.

The following examples illustrate the present teachings.

Example 1

Electrospinning Procedure Used for Fabricating PENFs

In 20 mL of distilled water, 2 gm of polypyrrole and 1 gm of ZnO nanowire were added with continuous stirring for 2 hours until a homogenous, viscous solution was obtained. The solution was electrospun at 30 kV driving voltages at ambient temperature (NEU-010 Nanofiber Electrospinning Unit, Kes Kato Tech Co., Japan). The capillary tip of the syringe had a diameter of 0.5 mm. The counter electrode was a grounded metal screen coated in a paper sheet that was placed 20 cm from the capillary tip. On the paper target, continuous nanofibers were deposited and gathered in the form of non-woven fibrous mats. The prepared nanofiber mats were stored in a desiccator and had a uniform thickness of roughly 10 μm-20 μm.

Example 2

Regarding Hydrothermal Method of Making the ZnO MNWs

An aqueous solution of zinc acetate hexahydrate and hexamine was prepared for the chemical co-precipitation growth process. Both were kept at a constant concentration of 0.1M. In a 50 mL beaker, aqueous solutions of zinc acetate hexahydrate (20 mL) and hexamine (20 mL) were mixed together. To change the pH, 0.1 M aqueous ammonia was added to the solution. The amount added was determined by the desired pH. 4-6 mL of aqueous ammonia was used to elevate the pH to 9.00. The original growing solution was transferred in a crucible and placed in a tube furnace for 2 hours at a constant temperature of 500° C. The crucible was removed from the furnace after growth, and the obtained white powder was rinsed with distilled water, dried at room temperature, and then characterized via scan electron microscopy.

It is to be understood that the polymeric electrolyte nanofiber membranes is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A polymeric electrolyte nanofiber membrane, comprising:
   a plurality of polymeric electrolyte nanofibers; and
   a plurality of aligned metal nanowires in the polymeric electrolyte nanofibers,
   wherein the polymeric electrolyte nanofibers are made from polypyrrole, wherein the polypyrrole nanofiber has a diameter of about 140 nm.

2. The polymeric electrolyte nanofiber membrane of claim 1, wherein the nanofibers are formed from the same polymeric nanofiber materials.

3. The polymeric electrolyte nanofiber membrane of claim 1, wherein the nanowires comprise a metal selected from the group consisting of copper, and zinc.

4. The polymeric electrolyte nanofiber membrane of claim 1, wherein the nanowires comprise ZnO nanowires.

5. The polymeric electrolyte nanofiber membrane of claim 1, wherein the thickness of the polymeric electrolyte nanofiber membrane ranges from about 10 µm to about 20 µm.

6. The polymeric electrolyte nanofiber membrane of claim 1, wherein the nanowires are hexagonal.

7. The polymeric electrolyte nanofiber membrane of claim 1, wherein the nanowires have a diameter ranging from about 60 nm to about 100 nm.

8. The polymeric electrolyte nanofiber membrane of claim 1, wherein the nanowires have a length ranging from about 1 µm to about 3 µm.

9. The polymeric electrolyte nanofiber membrane of claim 1, wherein the membrane is a nonwoven fibrous mat.

10. A polymeric electrolyte nanofiber membrane, comprising:
    a plurality of polymeric electrolyte nanofibers; and
    a plurality of aligned metal nanowires in the polymeric electrolyte nanofibers,
    wherein the polymeric electrolyte nanofibers are made from polypyrrole and the nanowires comprise a metal selected from the group consisting of copper and zinc wherein the polypyrrole nanofiber has a diameter of about 140 nm.

11. The polymeric electrolyte nanofiber membrane of claim 10, wherein the thickness of the polymeric electrolyte nanofiber membrane ranges from about 10 µm to about 20 µm.

12. The polymeric electrolyte nanofiber membrane of claim 10, wherein the nanowires are hexagonal.

13. The polymeric electrolyte nanofiber membrane of claim 10, wherein the nanowires comprise ZnO nanowires.

14. The polymeric electrolyte nanofiber membrane of claim 10, wherein the nanowires have a diameter ranging from about 60 nm to about 100 nm.

15. The polymeric electrolyte nanofiber membrane of claim 10, wherein the nanowires have a length ranging from about 1 µm to about 3 µm.

16. The polymeric electrolyte nanofiber membrane of claim 10, wherein the membrane is a nonwoven fibrous mat.

\* \* \* \* \*